US006350109B1

United States Patent
Brunet et al.

(10) Patent No.: US 6,350,109 B1
(45) Date of Patent: Feb. 26, 2002

(54) ROTARY PUMP WITH IMMERSED ROTOR

(75) Inventors: Maurice Brunet, Pres Vernon; Eric Helene, Oissel, both of (FR)

(73) Assignee: Societe de Mecanique Magnetique, Saint-Marcel (FR)

(*) Notice: Subject to any disclaimer, the term of this patent is extended or adjusted under 35 U.S.C. 154(b) by 0 days.

(21) Appl. No.: 09/508,466

(22) PCT Filed: Sep. 10, 1998

(86) PCT No.: PCT/FR98/01935

§ 371 Date: Mar. 10, 2000

§ 102(e) Date: Mar. 10, 2000

(87) PCT Pub. No.: WO99/14503

PCT Pub. Date: Mar. 25, 1999

(30) Foreign Application Priority Data

Sep. 12, 1997 (FR) .............................................. 97/11363

(51) Int. Cl.$^7$ ................................................. F04B 35/04
(52) U.S. Cl. .................... 417/365; 417/370; 417/423.7; 417/423.12
(58) Field of Search ................................. 417/365, 368, 417/369, 423.3, 423.7, 423.8, 423.12, 370

(56) References Cited

U.S. PATENT DOCUMENTS 2,953,993 A * 9/1960 Strickland et al. .......... 417/366

5,370,509 A * 12/1994 Golding et al. .......... 417/432.1
6,082,974 A * 7/2000 Takemoto et al. .......... 417/366

FOREIGN PATENT DOCUMENTS

| CH | 305 818 | 5/1955 |
| EP | 0 346 730 | 12/1989 |
| EP | 0 612 135 | 8/1994 |
| WO | WO 96/31937 | 10/1996 |

OTHER PUBLICATIONS

"Design, construction and test of magnetic bearings in an industrial canned motor pump", P.E. Allaire et al., World Pumps, No. 9, Sep. 1, 1989, pp. 312–319.

* cited by examiner

Primary Examiner—Charles G. Freay
(74) Attorney, Agent, or Firm—McDermott, Will & Emery

(57) ABSTRACT

A rotary pump (PP) for taking in a liquid such as a hydrocarbon comprises a pump wheel (1) secured to a rotor (4) which is immersed in a portion of the liquid taken in by the pump. A motor (11) having a stator element (111) mounted in a case (5) and a rotor element (110) mounted on the rotor (4) serves to cause the rotor (4) to rotate about an axis (40). Radial magnetic bearings (7, 8) and axial magnetic bearings (9, 10) support and guide the rotor (4) inside an enclosure (6). A jacket (61) is provided to protect the stator element (111) of the motor (11) from the liquid. The pump is characterized in that the rotor (4) has at least one groove (45, 46) in an outer surface that is covered by the liquid, particularly to reduce the inertial effects due to the liquid.

13 Claims, 3 Drawing Sheets

ROTARY PUMP WITH IMMERSED ROTOR

The present invention relates to a rotary pump with an immersed rotor, in particular for use in taking up and then delivering liquids, such as hydrocarbons, that come from chemical processes.

Immersed-rotor rotary pumps known in the prior art generally comprise a pump wheel rotated by an electric motor. The electric motor is constituted by a stator element or "stator", mounted in a case, and a rotor element or "rotor" that directly engages the pump wheel. A fraction of the liquid taken up by the pump is diverted to act as a cooling liquid in which the rotor is immersed. The stator of the motor is protected from said cooling liquid by a leakproof wall.

The cooling liquid flowing over the outer wall of the rotor constitutes a mass which does indeed oppose rotation of the rotor, but which above all gives rise to a considerable increase in the radial inertia of the rotor, whatever its speed, because of the small size of the magnetic gap of the motor (about 1 mm). This additional inertia is proportional to $R/\epsilon$ (where R is the radius of the rotor and $\epsilon$ is the gap) and it is very harmful to obtaining stable and robust control of means for supporting and guiding the rotor, such as magnetic bearings.

The present invention seeks to remedy the above-mentioned drawbacks, and in particular to improve the stability and the quality of the control applied to the means for supporting and guiding the rotor of an immersed-rotor rotary pump.

To this end, the present invention proposes adding liquid recirculation grooves so as to increase the overall magnetic gap virtually, thereby reducing the above-mentioned phenomenon of radial inertia of the rotor.

For example, if the magnetic gap is 200 mm long and 1 mm across, four grooves that are 10 mm long (giving a total of 40 mm) and 10 mm deep can reduce the above-mentioned phenomenon by a ratio of one to two:

$$\left(\frac{40}{200} \times \frac{10}{1} = 2\right)$$

More particularly, the invention provides a rotary pump for taking in liquid, the pump comprising a pump wheel secured to a rotor immersed in a portion of said liquid taken in by the pump, a motor comprising a stator element mounted in a case and a rotor element mounted on the rotor to rotate the rotor about an axis, means for supporting and guiding the rotor, and protection means for protecting the stator element of the motor from said liquid, the pump being characterized in that the rotor comprises at least one groove in an outer surface covered by said portion of the liquid, in particular to reduce inertial effects during radial displacements and due to said portion of the liquid.

In order to facilitate the flow of the liquid over the outer surface of the rotor, the groove can be formed over the entire outline of the rotor. The outline can be situated, for example, in a plane that is substantially perpendicular to the axis of rotation.

The support and guidance means most commonly used in rotary pumps of the prior art comprise smooth mechanical bearings which are lubricated by the liquid taken in by the pump. Such bearings can frequently be stressed in abnormal manner, in particular in the event of the liquid evaporating or in the event of cavitation in the pump. They must therefore be changed periodically, thereby giving rise to a high level of cost and requiring the user to open up the pump.

In the present invention, the rotor is supported and guided by magnetic bearings which do not require any special maintenance.

In a first embodiment of the invention, the support and guide means comprise at least one radial active magnetic bearing of the cylindrical type for servo-controlling the radial position of the rotor on a radial equilibrium position, and axial active magnetic bearings for servo-controlling the axial position of the rotor on an axial equilibrium position. The radial active magnetic bearing is preferably a self-detecting bearing, i.e. a bearing suitable on its own for detecting the radial position of the rotor. For servo-control of the axial position of the rotor, an axial position detector is nevertheless provided at one end of the rotor. The axial active magnetic bearings then servo-control the axial position of the rotor as a function of position information provided by the detector.

In a second embodiment of the invention, the support and guidance means comprise active magnetic bearings of the conical type for servo-controlling both the radial and the axial positions of the rotor on respective equilibrium positions. Each of the conical active magnetic bearings is suitable for detecting the radial position of the rotor. The axial position of the rotor is detected by an axial position detector mounted at one end of the rotor.

In both of the above embodiments, the use of self-detecting magnetic bearings makes it possible to reduce the cost of manufacturing the pump compared with using distinct radial position detectors for the radial bearings.

The above-specified cylindrical or conical radial magnetic bearings can be homopolar or heteropolar.

Typically, the protection means is constituted by a jacket preventing said portion of the liquid that covers the rotor from penetrating into a cavity of the case in which the stator element of the motor is mounted. Said cavity of the case can be filled with a substance that has been injected under pressure (elastomer, epoxy resin, sand) to reinforce the protection of the stator element of the motor against the portion of the liquid that covers the rotor.

A bore can be formed in the rotor along its axis of rotation to convey said portion of the liquid that covers the rotor towards the pump wheel from the end of the rotor that is remote from the pump wheel. The bore makes it possible to minimize liquid circulation over the outer surface of the rotor, thereby limiting the axial loading applied to the bearings and to the motor.

Given that the pump is usually to be found in a dangerous area, means must be provided to prevent any explosion at the electrical connections. In the invention, an explosion-proof and leakproof compartment is included in the case to house the electronic power supply and control circuits for the guide means, i.e. the magnetic bearings. A first explosion-proof junction box fixed to the case enables said electronic circuits to be electrically connected to the electricity mains. A second explosion-proof junction box fixed to the case enables the motor to be connected to the electricity mains.

Advantageously, the means for supporting and guiding the rotor comprise first and second radial active magnetic bearings disposed at opposite ends of the motor and liquid recirculation grooves are provided in the outer surface of the rotor in zones situated between the motor and each of the first and second radial magnetic bearings so as to reduce the inertial effects due to said portion of the liquid.

Other characteristics and advantages of the present invention will appear on reading the following description of particular embodiments, given as examples and described with reference to the accompanying drawings, in which.

Figure 1:
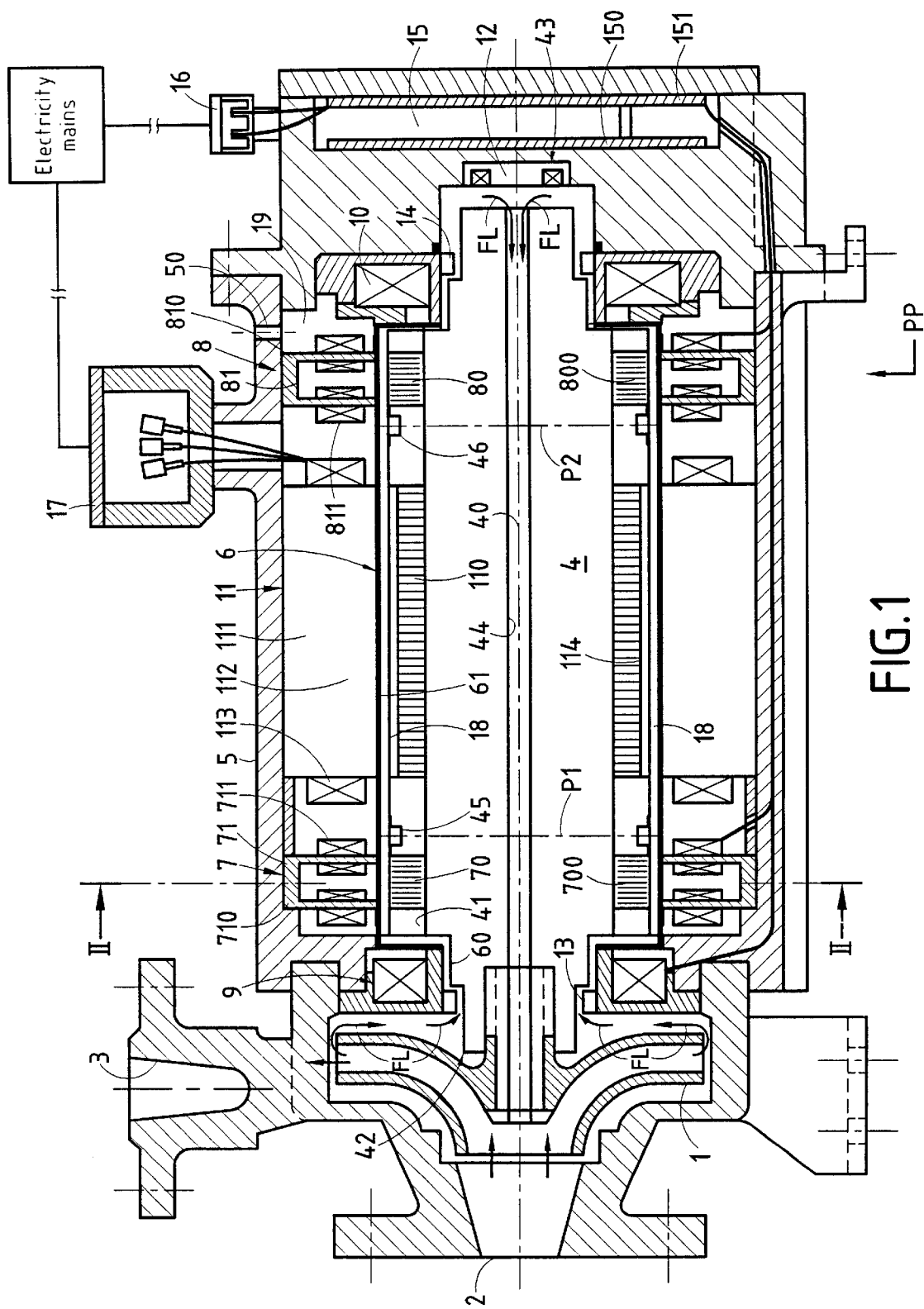
FIG. 1 is a diagram showing the principles of a rotary pump constituting a first embodiment of the invention.

With reference to FIG. 1, a pump PP constituting a first embodiment of the invention comprises a pump wheel 1 for taking in liquid, such as a chemical or a hydrocarbon, through an inlet orifice 2, and for delivering the liquid through an outlet orifice 3. The pump wheel 1 is secured to a rotor 4 which is rotated about a longitudinal axis 40 relative to a fixed case 5. The rotor 4 is suspended without contact in a substantially cylindrical enclosure 6 inside the case 5 by means of radial magnetic bearings 7, 8 and axial magnetic bearings 9, 10, and it is driven by an asynchronous electric motor 11.

The motor 11 comprises a rotor element 110 in the form of a rotor magnetic circuit 4 disposed over an outer peripheral surface 41 thereof inside the enclosure 6, and a stator element 111 mounted inside the case 5, outside the enclosure 6, and facing the magnetic circuit 110. The stator element 111 has a core 112 formed by a stack of ferromagnetic laminations, and a winding 113 associated with the core 112. The laminations forming the core 112 are typically made out of silicon iron alloy of the non-oriented type, and are of a thickness lying in the range 0.3 mm to 0.5 mm. The magnetic circuit 110 can be of the squirrel-cage type or it can be implemented as a cage at the surface of the magnetic gap made of a material such as copper or aluminum associated with a ferromagnetic core that can itself be laminated or otherwise.

The radial magnetic bearings 7 and 8 are identical and are disposed at opposite ends of the motor 11. Each comprises an annular armature 70, 80 of ferromagnetic material mounted on the outer surface 41 of the rotor 4 inside the enclosure 6, and electromagnets 71, 81 fixed to the case 5 outside the enclosure 6 and facing the armature 70, 80. The electromagnets 71, 81 are made of U-shaped yokes 710, 810 supporting windings 711, 811. The radial magnetic bearings 7, 8 are advantageously "self-detecting" bearings which automatically detect position, e.g. of the type described in the Applicants' patent FR-B-2 716 700. These bearings are capable of detecting the radial position of the rotor 4 relative to the axis 40, and of servo-controlling said position to a stable radial equilibrium position. The use of such self-detecting bearings makes it possible to reduce the cost of manufacturing the pump PP by avoiding the use of distinct position detectors for the bearings.

The axial magnetic bearings 9 and 10, also known as "thrust bearings", are disposed outside the enclosure 6 respectively in the vicinities of a first end 42 of the rotor 4 close to the pump wheel 1 and of a second end 43 of the rotor 4 remote from the first end 42 and from the wheel 1. An axial position detector 12 of conventional type is also mounted at the second end 43 of the rotor 4 and is connected to the axial bearings 9 and 10 via an electronic control system for controlling the axial position of the rotor 4. The axial bearings 9, 10 servo-control the axial position of the rotor 4 on a stable axial equilibrium position as a function of information provided by the detector 12.

Emergency mechanical bearings 13, 14, advantageously made of ceramic, are provided in the vicinity respectively of each of the two ends 42 and 43 of the rotor 4. These bearings are used for guiding and supporting the rotor 4 within the enclosure 6 in the event of the radial magnetic bearings 7, 8 and/or the axial magnetic bearings 9, 10 failing. The bearings 13, 14, are thus used relatively infrequently, and possible deterioration in their state does not require any maintenance action to be taken during the lifetime of the pump PP.

The magnetic bearings 7 to 10 are powered and controlled electrically by means of electronics cards 150, 151 situated in an explosion-proof and leakproof compartment 15 included in the case 5 at the end thereof which is remote from the pump wheel 1, i.e. adjacent to the second end 43 of the rotor 4. The electronics cards 150, 151 are cards of the type conventionally used for powering and servo-controlling active magnetic bearings. A first card 150 has electronic power circuits for powering the windings 711 and 811 of the radial bearings 7, 8 and of the axial bearings 9, 10. A second card 151 has servo-control circuits for controlling the radial position of the rotor 4 by means of the radial bearings 7, 8 that themselves detect position, and the axial position of the rotor 4 by means of the axial bearings 9, 10 that operate as a function of information provided by the axial position detector 12. The electronics cards 150, 151 are connected to a first explosion-proof junction box 16 of the EEX type which is fixed to the case 5 and which is itself connected to the single phase electricity mains.

The winding 113 of the motor 11 is electrically connected to a second explosion-proof junction box 17, likewise of the EEX type, which is fixed to the case 5 and is itself connected to three-phase electricity mains.

Integrating the electronic circuits for controlling the active magnetic bearings within the pump itself makes it possible to avoid using cables that are long and expensive for connecting the pump to a control unit which would otherwise need to be located in a zone where there is no risk of explosion.

As shown in FIG. 1, the assembly constituted by the rotor 4, the magnetic circuit of the motor 110, and the armatures of the magnetic bearings 70, 80 is substantially cylindrical in shape. An empty space 18 is defined between said assembly and a wall 60 of the enclosure 6. The minimum spacing between the assembly 4-110-70-80 and the wall 60 of the enclosure 6 is typically 1 mm. The wall 60 of the enclosure 6 is for the most part constituted by a jacket 61 (drawn in bold lines in FIG. 1) which extends parallel to the axis 40 substantially between the first and second ends 42 and 43 of the rotor 4 and passing in particular through the respective magnetic gaps of the radial magnetic bearings 7 and 8, and of the motor 11. The jacket 61 whose thickness lies in the range 0.3 mm to 0.5 mm is made of a metal, such as a stainless steel, an alloy of the Hastelloy family, or titanium, or it is made of a composite material, and it is treated against corrosion. The jacket 61 can be magnetic in the zones which correspond to the radial bearings 7, 8 and to the motor 11, or else only in the zones which correspond to the bearings 7, 8. The jacket 61 serves as a protective wall separating the rotor 4, the magnetic circuit 110, and the annular armatures 70, 80 from a cavity 19 in the case 5 in which there are mounted the stator element 111 of the motor 11 and the stator elements 71, 81 of the radial magnetic bearings 7, 8. The above-mentioned stator elements 111, 71, and 81 preferably come into contact with the jacket 61 and are, for example, welded thereto.

In operation, the liquid taken in by the pump wheel 1 through the inlet orifice 2 is delivered through the outlet orifice 3 of the pump PP, as described above. However, a portion of the liquid taken in penetrates from the periphery of the wheel 1 into the empty space 18 inside the enclosure 6 by following the paths marked by arrows FL in FIG. 1 so as to serve as a cooling liquid. This liquid flows through the empty space 18 from the first end 42 to the second end 43 of the rotor 4 over portions of the outer surface 41 of the rotor 4 that are not covered by the rotor elements 110, 70, and 80, and over respective outer surfaces 114, 700, and 800 of the above-specified rotor elements. On reaching the second end 43 of the rotor 4, the liquid is removed via the first end 42 and the pump wheel 1 by passing along a bore 44 formed in the center of the rotor 4 along the axis 40.

The rotor 4 and the rotor elements 110, 70, and 80 are thus completely immersed in the working liquid, i.e. the liquid taken in by the pump PP. In order to protect the rotor elements 110, 70, and 80 against the working liquid, which can be corrosive, these elements are coated in respective metal or ceramic protective layers constituting their outer surfaces 114, 700, and 800. The cavity 19 in the case 5 is protected from the working liquid by the jacket 61. The cavity 19 is also filled with a substance that has been injected under pressure (elastomer, resin, sand, . . . ) which can be inserted via a suitable orifice 50 formed through an outside face of the case 5 and opening out into the cavity 19. This high pressure filling reinforces the protection of the stator elements 71, 81, and 111 of the radial magnetic bearings 7, 8 and of the motor 11 against the working liquid circulating in the empty space 18.

The working liquid in the empty space 18 constitutes a mass that opposes displacement of the rotor 4. In addition, because of the small distance between the assembly comprising the rotor 4 and the rotor elements 110, 70, and 80, and the wall 60 of the enclosure 6, said liquid travels quickly through the empty space 18. A large amount of energy therefore needs to be supplied by the motor 11 in order to keep the rotor 4 rotating. Furthermore, the presence of the liquid in the magnetic gaps of the magnetic bearings 7, 8 disturbs the operation thereof.

In accordance with the present invention, in order to minimize the inertial effects due to the liquid, liquid flow grooves 45 and 46 are provided in portions of the outer surface 41 of the rotor 4 where they are not covered by the rotor elements 110, 70, and 80. The grooves 45, 46 are machined along the respective outlines of the rotor 4 lying in transverse planes P1 and P2 perpendicular to the longitudinal axis of rotation 40 and preferably situated between the radial magnetic bearing 7 and the motor 11, and between the motor 11 and the radial magnetic bearing 8, as the case may be. These flow grooves 45 and 46 operate as unjamming basins making it possible by means of a flow of fluid within these grooves to reduce the speed of the liquid locally in the vicinity of the planes P1 and P2, thereby reducing the overall inertia of the liquid in the empty space 18.

By way of example, the grooves 45 and 46 have a width (parallel to the axis 40) and a depth (parallel to the planes P1 and P2) of about 1 cm.

Figure 2:
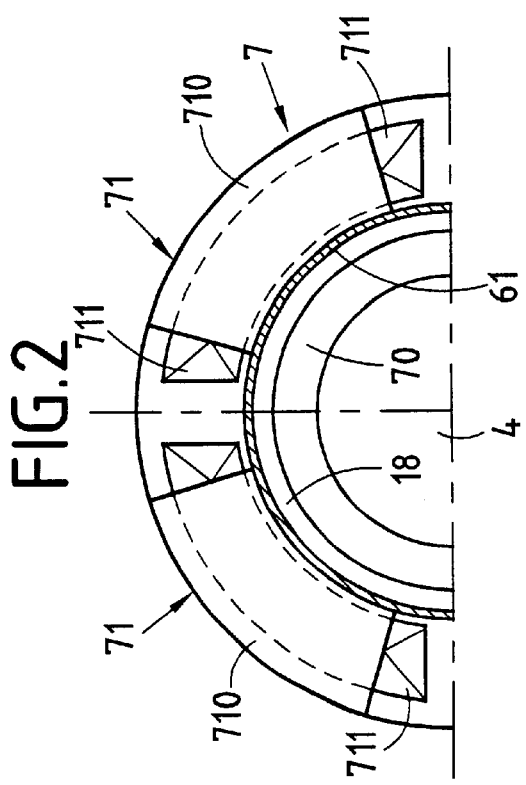
FIG. 2 is a diagrammatic half-section view of a homopolar radial magnetic bearing on line II—II of FIG. 1.

FIG. 2 shows a different view of the radial magnetic bearing 7 of FIG. 1, which bearing is identical to the radial bearing 8. The bearing 7 is of the cylindrical type, i.e. it has a magnetic gap defined by cylindrical surfaces that match the cylindrical shape of the rotor 4, as shown in FIG. 1, and it is homopolar. The bearing 7 has four electromagnets 71 that are regularly distributed around the annular armature 70 fixed on the rotor 4, thereby forming four poles. Each of the electromagnets 71 comprises a yoke 710 in the form of a portion of a ring and made of a magnetic material that can be solid, and a winding 711 mounted on the yoke 710. With this type of axial flux homopolar bearing, it is not essential for the annular armature 70 to be laminated, although that is possible, as shown in the drawings.

FIGS. 1 and 2 show radial magnetic bearings of the homopolar type. Nevertheless, it is also possible to use radial magnetic bearings of the heteropolar type, i.e. having radial flux.

Figure 3:
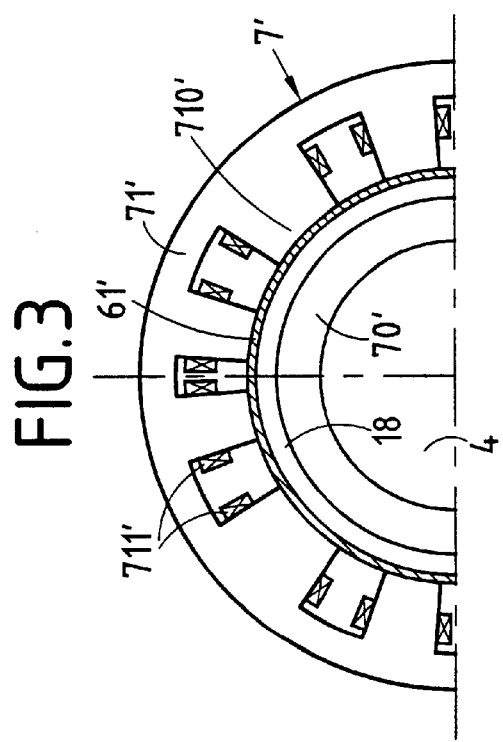
FIG. 3 is likewise a radial half-section, but showing an example of a heteropolar radial magnetic bearing that could replace the radial magnetic bearing of FIG. 2.

Thus, FIG. 3 is a diagram of such a variant embodiment of the radial magnetic bearing 7 or 8 of FIG. 1. In this variant, the radial bearing, referenced 7', is of the heteropolar cylindrical type and comprises a stator structure of laminated magnetic material 71' and an annular armature 70' fixed to the rotor 4. The stator structure 71' has teeth 710' that are regularly distributed around the annular armature 70', extending towards the axis 40 of the rotor 4. Each tooth 710' carries a winding 711'. The annular armature 70' is laminated and made up of stacked laminations which are protected from the fluid by a coating which may be metallic, e.g. by nickel-plating, or which may be ceramic.

Figure 4:
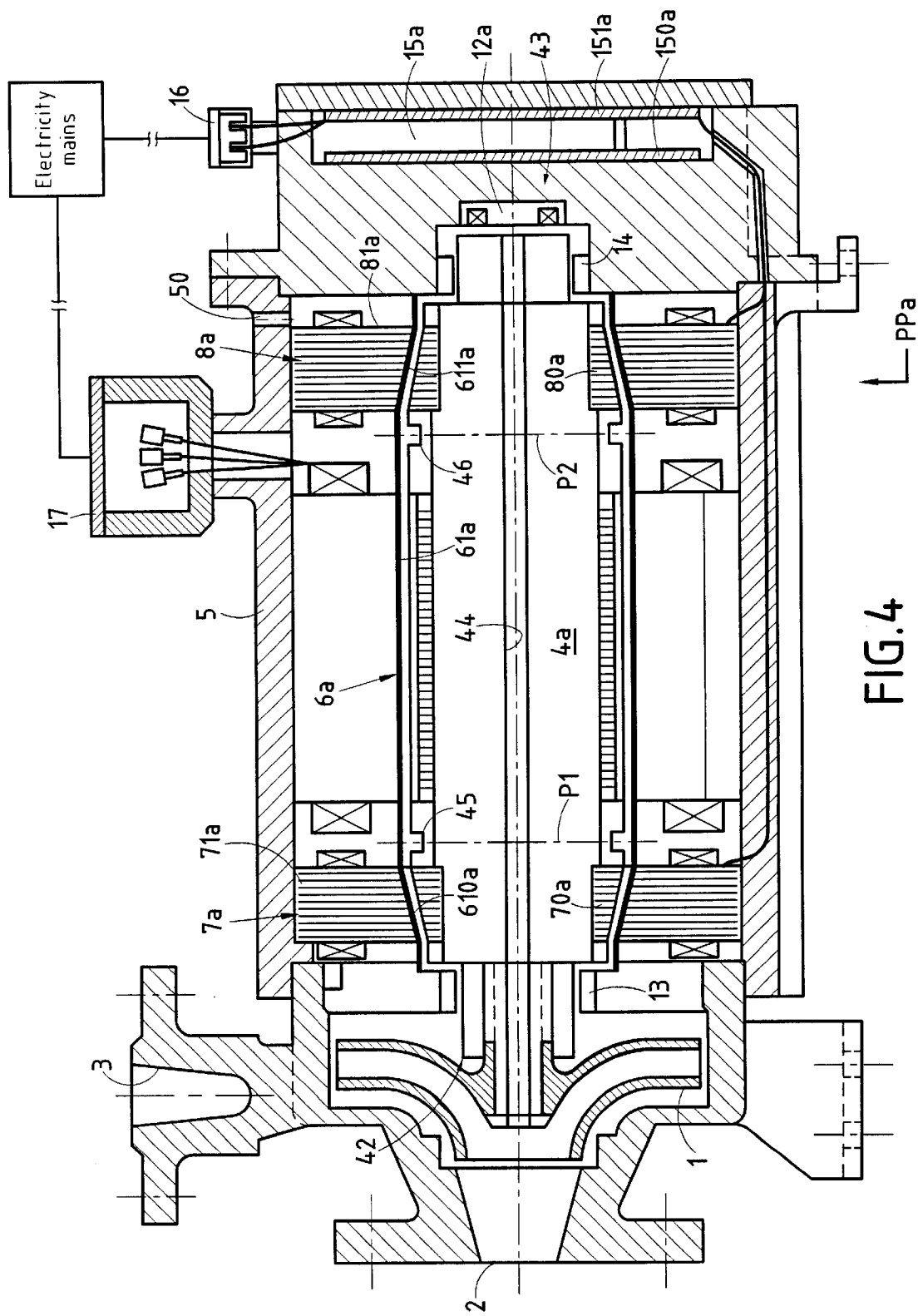
FIG. 4 is a diagram showing the principles of a rotary pump constituting a second embodiment of the invention.

FIG. 4 shows a pump PPa constituting a second embodiment of the invention. The pump PPa differs from the pump PP shown in FIG. 1 essentially in that the cylindrical type radial magnetic bearings 7, 8 are replaced by conical type magnetic bearings 7a and 8a having magnetic gaps that are defined by frustoconical surfaces. These bearings 7a and 8a can serve to center the rotor 4a both in the radial direction and in the axial direction. The axial bearings 9 and 10 of FIG. 1 are thus omitted in this second embodiment.

The bearings 7a and 8a together with their associated electronic circuits in the control card 151a inside the compartment 15a are capable of detecting the radial position of the rotor 4a and of servo-controlling said position on a stable radial equilibrium position. To position the rotor 4a axially, the conical bearings 7a, 8a are servo-controlled as a function of information supplied by the axial position detector 12a to the electronic control card 151a.

The enclosure 6a, and more particularly the jacket 61a, has frustoconical portions 610a and 611a in the parts thereof corresponding to the conical bearings 7a and 8a respectively, so as to match the frustoconical shapes thereof.

The radial magnetic bearings 7a and 8a of FIG. 4 are shown as being bearings of the heteropolar type, with laminated annular armatures 70a and 80a, and they can be made in the same manner as the annular armature 70' of FIG. 3, and with stator circuits 71a and 81a that can be made like the stator circuit 71' of FIG. 3;

The conical radial magnetic bearings 7a and 8a of FIG. 4 can nevertheless also be of the radial flux homopolar type, being made using technology analogous to that described for the homopolar cylindrical radial magnetic bearings 7, 8 described with reference to FIGS. 1 and 2. In this case, the annular armatures of the bearings are made of a magnetic material that need not be laminated, and the stator circuits of the radial conical bearings comprise a set of axial flux electromagnets distributed around the jacket 61a (in a manner analogous to FIG. 2), instead of a stack of toothed stator laminations fitted with windings so as to produce radial flux (as shown in FIG. 3).

Figure 5:
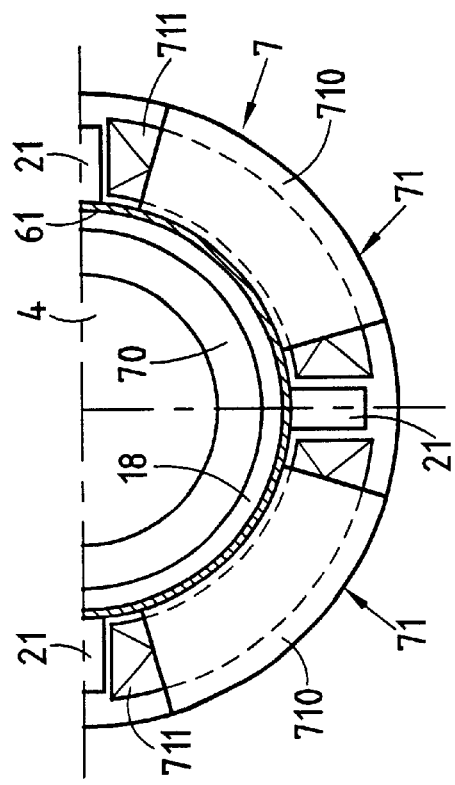
FIGS. 5 and 6 are radial half-section views analogous to those of FIGS. 2 and 3, but showing the use of position detectors incorporated in the stator of the radial magnetic bearing.
Figure 6:
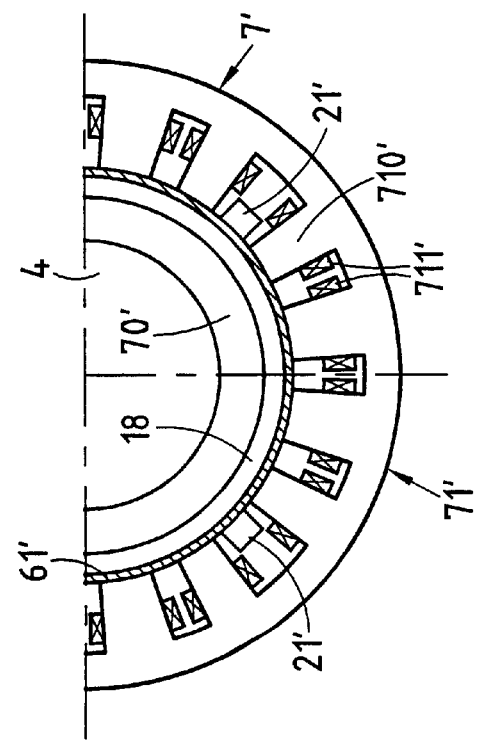

Various modifications and additions can be provided to the embodiments described above. Thus, for example, the radial magnetic bearings need not be self-detecting bearings, but can be bearings that have position detectors 21, 21' operating through the metal wall 6 or 6a and interposed between the electromagnets 71, 71' of the stator of a radial magnetic bearing (FIGS. 5 and 6) so as to deliver position information to the electronic control circuits 151, 151*a*.

What is claimed is:

1. A rotary pump for taking in a liquid, the pump comprising a pump wheel secured to a rotor immersed in a portion of said liquid taken in by the pump, a motor comprising a stator element mounted in a case, and a rotor element mounted on the rotor to rotate the rotor about an axis, means for supporting and guiding the rotor, and protective means for protecting the stator element of the motor from said liquid, the rotor having at least one groove formed in an outer surface covered by said portion of the liquid, the pump being characterized in that the means for supporting and guiding the rotor comprise first and second radial active magnetic bearings disposed at opposite ends of the motor, in that liquid recirculation grooves are formed in the outer surface of the rotor in zones situated between the motor and each of the first and second radial magnetic bearings, and in that each liquid recirculation groove is formed around an outline of the rotor situated in a plane that is substantially perpendicular to the axis of rotation, whereby inertial effects due to said portion of the liquid during radial displacements of the rotor are reduced.

2. A pump according to claim 1, characterized in that said means for supporting and guiding the rotor comprise at least one active radial magnetic bearing of the cylindrical type for servo-controlling the radial position of the rotor on a radial equilibrium position, and axial active magnetic bearings for servo-controlling the axial position of the rotor on an axial equilibrium position.

3. A pump according to claim 2, characterized in that said radial active magnetic bearing is a bearing of the self-detecting type which automatically detects the radial position of the rotor.

4. A pump according to claim 1, characterized in that said means for supporting and guiding the rotor comprise conical type active type magnetic bearings for servo-controlling both the radial and the axial positions of the rotor on respective equilibrium positions.

5. A pump according to claim 4, characterized in that said conical type active magnetic bearings are bearings of the self-detecting type that automatically detect the radial position of the rotor.

6. A pump according to claim 1, characterized in that said protective means is constituted by a jacket preventing said portion of the liquid that covers the rotor from penetrating into a cavity in the case within which the stator element of the motor is mounted.

7. A pump according to claim 1, characterized in that a bore is formed in the rotor along the axis of rotation to remove said portion of the liquid covering the rotor towards the pump wheel from an end of the rotor that is remote from the pump wheel.

8. A pump according to claim 1, further comprising a compartment integrated in the case for housing electronic circuits for powering and controlling said means for supporting and guiding the rotor.

9. A pump according to claim 8, characterized in that a junction box is fixed to the case for enabling said electronic circuits to be electrically connected to electricity mains.

10. A pump according to claim 1, characterized in that a junction box is fixed to the case for enabling the motor to be connected to electricity mains.

11. A pump according to claim 8, characterized in that said compartment integrated in the case is explosion-proof and leakproof.

12. A pump according to claim 9, characterized in that said junction box fixed to the case is an explosion-proof junction box.

13. A pump according to claim 10, characterized in that said junction box fixed to the case is an explosion-proof junction box.

* * * * *